United States Patent [19]
O'Donnell

[11] Patent Number: 6,032,177
[45] Date of Patent: Feb. 29, 2000

[54] METHOD AND APPARATUS FOR CONDUCTING AN INTERVIEW BETWEEN A SERVER COMPUTER AND A RESPONDENT COMPUTER

[76] Inventor: Charles A. O'Donnell, 25 Red Robin Rd., Naugatuck, Conn. 06770

[21] Appl. No.: 08/862,723

[22] Filed: May 23, 1997

[51] Int. Cl.[7] .............................. G06F 13/14; G06F 13/00
[52] U.S. Cl. ........................... 709/204; 709/227; 709/217
[58] Field of Search ........................ 395/200.34, 200.32, 395/200.33, 200.36, 200.55, 200.57, 200.58, 200.47; 379/93.31; 709/204, 227, 217, 203; 710/105

[56] References Cited

U.S. PATENT DOCUMENTS

| | | | |
|---|---|---|---|
| 5,257,384 | 10/1993 | Farrand et al. | 395/725 |
| 5,784,562 | 7/1998 | Diener | 395/200.47 |

*Primary Examiner*—Moustafa M. Meky
*Assistant Examiner*—Quoc-Khanh Le
*Attorney, Agent, or Firm*—McCormick, Paulding & Huber LLP

[57] ABSTRACT

In an apparatus and method for conducting an interview between a server computer and a respondent computer, the interview includes a number of questions and each question has a unique question identifier. The server computer generates and transmits to the respondent computer signals indicative of a first question and signals indicative of a first question identifier, which is the question identifier of the first question. The respondent computer, in turn, generates and transmits to the server computer signals indicative of the identity of the respondent, signals indicative of a first answer to a second question, and signals indicative of a second question identifier, which is the question identifier of the second question. The respondent computer thereby answers the second question. The server computer stores the signals indicative of the first answer at a location prescribed by the signals indicative of the identity of the respondent computer. The server computer thereby associates the first answer as being transmitted by the respondent computer in response to the second question.

4 Claims, 2 Drawing Sheets

METHOD AND APPARATUS FOR CONDUCTING AN INTERVIEW BETWEEN A SERVER COMPUTER AND A RESPONDENT COMPUTER

FIELD OF THE INVENTION

The present invention relates to systems which conduct an interview, and more specifically to systems which conduct an interview between a server computer and a respondent computer.

BACKGROUND OF THE INVENTION

Conducting an interview is a process by which an interviewer provides a plurality of questions to a respondent, and the respondent provides answers to the questions. An interview includes a plurality of questions and may also include additional features, such as explanatory information for clarifying the questions and/or instructions on how to provide the answers to the interviewer.

Typically, the answers from several respondents are compiled and utilized for any of a number of purposes, such as marketing research studies, consumer profiles, consumer satisfaction, advertising effectiveness, consumer preferences, market price sensitivity, consumer profiles, brand name recognition, concept testing, volume forecasting, employee satisfaction and problem detection. However, the answers from respondents should ideally be checked for errors and illogical information. In addition, ideally only the answers from "qualified" respondents are compiled and utilized. For example, if certain questions are directed to a respondent's experience with a product, only respondents who have used the product would be considered qualified respondents.

The process of preventing unqualified respondents from answering prescribed questions is known as "moderation". In general, there are three ways to conduct an interview in which respondents are moderated: (i) moderation by the respondent, (ii) moderation by the interviewer, and (iii) moderation by a computer or other computing device.

Moderation by the respondent is typically performed by providing the respondent with instructions which accompany the questions of the interview. For example, one instruction might be the text "If you answered YES to the last question, please skip to question 9". Moderation by the respondent is typically accomplished with self-administered questionnaires, which may be sent to the respondent by mail, facsimile transmission or electronic mail transmission. Moderation by the respondent is not preferable, and is the least reliable method of moderation because a respondent may inadvertently or deliberately fail to follow the instructions.

Moderation by the interviewer is typically performed by providing the interviewer with instructions and the questions of the interview. Moderation by the interviewer is typically accomplished with face-to-face interviews and telephone surveys (with or without computer assistance). This method of moderation is likewise not preferable because the interviewer may ask leading questions or have biased opinions which affect the respondent's answers.

Moderation by a computer or similar computing device does not suffer from the above-described drawbacks of moderation by a human respondent or interviewer. Moderation by a computer may be accomplished by providing a computer programmed to conduct an interview at a booth, cubicle, kiosk or similar location accessible to the public. Answers received by each computer at each location are stored and later collected and compiled. However, requiring respondents to physically travel to computer locations is less desirable than allowing respondents to answer from more convenient locations such as their homes. Furthermore, collecting and compiling answers from a number of locations is time consuming and thus is undesirable.

Moderation by a computer may also be accomplished by providing respondents with a disk storing software which, when run on a computer, conducts an interview. The respondent's answers are stored on the disk. After the interview, each respondent returns his disk and the answers on the disks are compiled. This method of accomplishing moderation by a computer suffers from the need to collect and compile answers from a number of returned disks, and requires respondents to have the appropriate computer hardware and operating system to run the software stored on the disk.

A large and growing number of people have access to the Internet, a global computer network. It would be ideal to conduct an interview between respondent computers, located in respondents' homes and connected to the Internet, and a server computer which is connected to the Internet, and which collects and compiles the answers from the respondent computers. Answers from respondent computers would be more easily collected and compiled.

A large number of computers connected to the Internet communicate using Hypertext Transfer Protocol (HTTP), and these computers are HTTP clients and/or HTTP servers. Unfortunately, HTTP clients and HTTP servers exist in a "stateless" ("connectionless") relationship in which an HTTP client and an HTTP server do not continually exchange information unless a transfer from one to the other is in progress. This tends to limit the interaction between the HTTP client and the HTTP server to requests for and delivery of predetermined files. An explanation of the Internet and HTTP in particular may be found in RFC 1945, "Hypertext Transfer Protocol—HTTP/1.0", by T. Berners-Lee, R. Fielding and H. Frystyk, May 1996, and "The Mac Web Server Book", by Mark R. Bell and Rob Terrell, 1996, Ventana Communications Group, Inc., in particular pages 24–25, both of which are incorporated herein by reference as part of the present disclosure.

Because of the stateless relationship described above, an interview which includes moderation may not be easily performed over the Internet. In fact, it is generally believed that surveys and similar complex interviews cannot be successfully conducted over the Internet. Since there is no "memory" of what information has passed across the Internet between a server computer and a respondent computer, the server computer cannot easily determine which respondent has provided the answers received by the server computer.

Furthermore, if an interview between a server computer and a respondent computer were to be conducted over the Internet, the server computer could not easily determine which questions correspond to the received answers from the respondent computer. For example, the software used by HTTP clients for communicating with an HTTP server is known as a "web browser". Examples of web browsers include Netscape Navigator™, NCSA Mosaic™ and Microsoft Internet Explorer™. Web browsers typically provide the ability to review previous transmission from an HTTP server. For example, by actuating a graphical "Back button" defined by the web browser, previous questions may be retrieved. Thus, previous questions may be re-answered by the respondent, which can affect the selection and sequence of questions prescribed by the server software. If the server computer has transmitted second, third or subsequent questions to the respondent computer, and the respondent computer transmits answers to the server computer, the server cannot easily determine whether the transmitted answers are in response to the previous question sent by the server computer, or in response to earlier questions.

Accordingly, it is an object of the present invention to provide a method and apparatus for conducting an interview between a server computer and a respondent computer.

SUMMARY OF THE INVENTION

The present invention is directed to an apparatus and method for conducting an interview between a server computer and a respondent computer.

According to the present invention, the interview includes a number of questions, and each question has a unique question identifier. The server computer generates and transmits to the respondent computer signals indicative of a first question and signals indicative of a first question identifier, which is the question identifier of the first question.

The respondent computer, in turn, generates and transmits to the server computer signals indicative of the identity of the respondent, signals indicative of a first answer to a second question, and signals indicative of a second question identifier, which is the question identifier of the second question. The respondent computer thereby answers the second question.

The server computer stores the signals indicative of the first answer at a location prescribed by the signals indicative of the identity of the respondent computer. The server computer thereby associates the first answer as being transmitted by the respondent computer in response to the second question.

It is further preferred that the server computer compare the signals indicative of the first question identifier with the signals from the respondent computer indicative of the second question identifier. The server then stores the first answer if the comparison indicates that first question identifier is equal to the second question identifier, and thus the first question transmitted from the server is equal to the second question answered by the respondent computer.

If the first question transmitted from the server is not equal to the second question answered by the respondent computer, the server again transmits the signals indicative of the first question and the signals indicative of the first question identifier to the respondent computer, thereby eliciting from the respondent computer an answer to the first question.

One advantage of the apparatus and method of the present invention is that an interview between a server computer and a respondent computer may be conducted over the Internet using a stateless medium, such as HTTP.

Other advantages of the present invention will become apparent in view of the following detailed description and accompanying drawings.

BRIEF DESCRIPTION OF THE DRAWINGS

FIG. 3 is a flow chart illustrating conceptually the procedural steps for determining the identity of the respondent computer and identifying a question answered by the respondent.

FIG. 4 is a schematic illustration of a system for translating a text file, created by an entity desiring a survey or other interview, into server software.

DETAILED DESCRIPTION OF THE PREFERRED EMBODIMENT

The preferred embodiment of the present invention is embodied in a system for conducting an interview between a server computer and a respondent computer which are connected to each other via the Internet and communicate using HTTP or other connectionless protocol.

Figure 1:
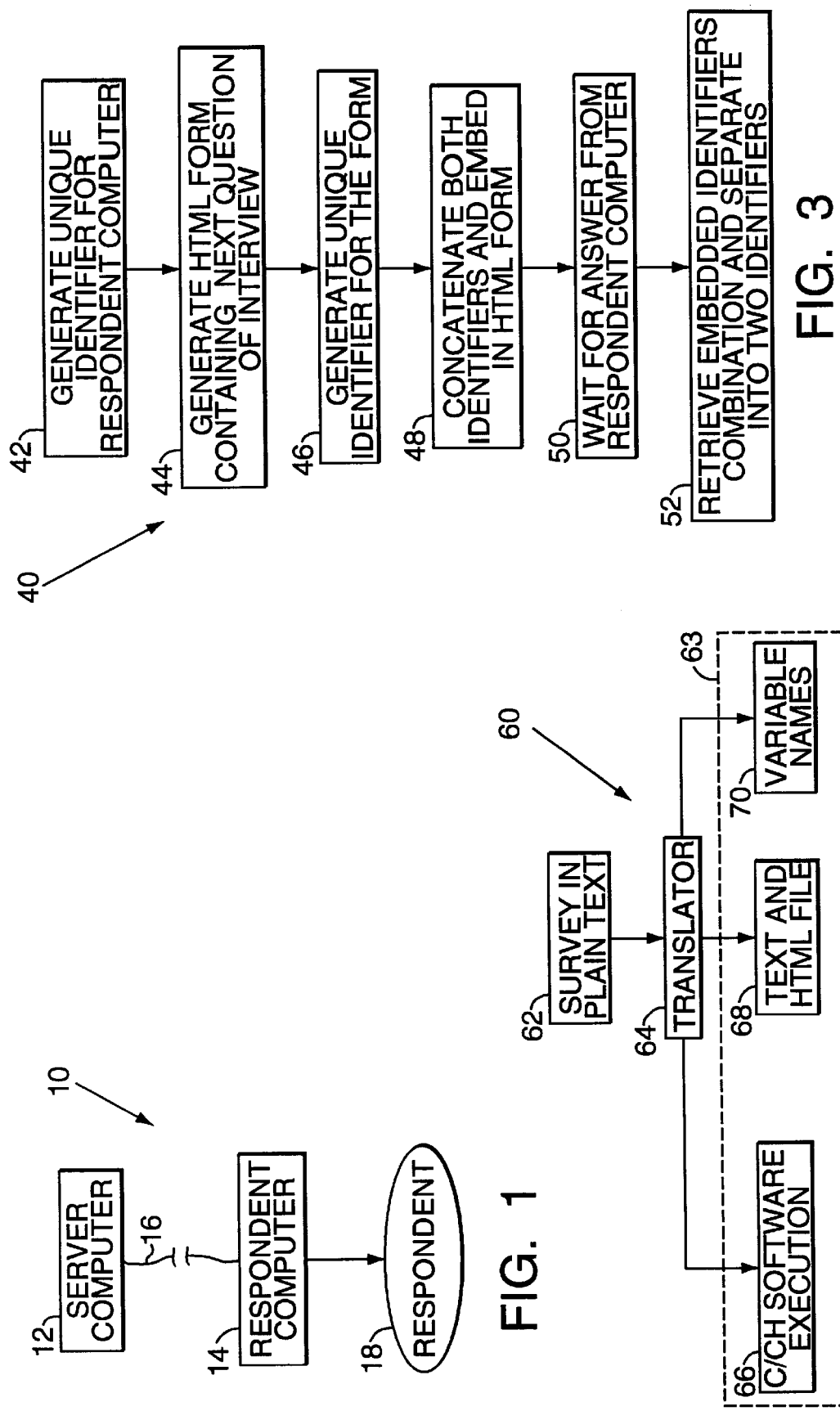
FIG. 1 is a schematic illustration of an apparatus for conducting an interview between a server computer and a respondent computer in accordance with the present invention.

In FIG. 1, an apparatus embodying the present invention for conducting an interview is indicated generally by the reference numeral 10. The apparatus 10 comprises a server computer 12 and a respondent computer 14 which are connected via a network link 16 forming a part of the Internet or similar stateless network medium. As is known in the art, the network link 16 typically comprises telephone lines and/or fiber optic cables which interface with the computers 12 and 14 in a known manner. A respondent 18 operates the respondent computer 14 in a known manner, preferably by operating a web browser (not shown) running on the respondent computer 14.

Figure 2:
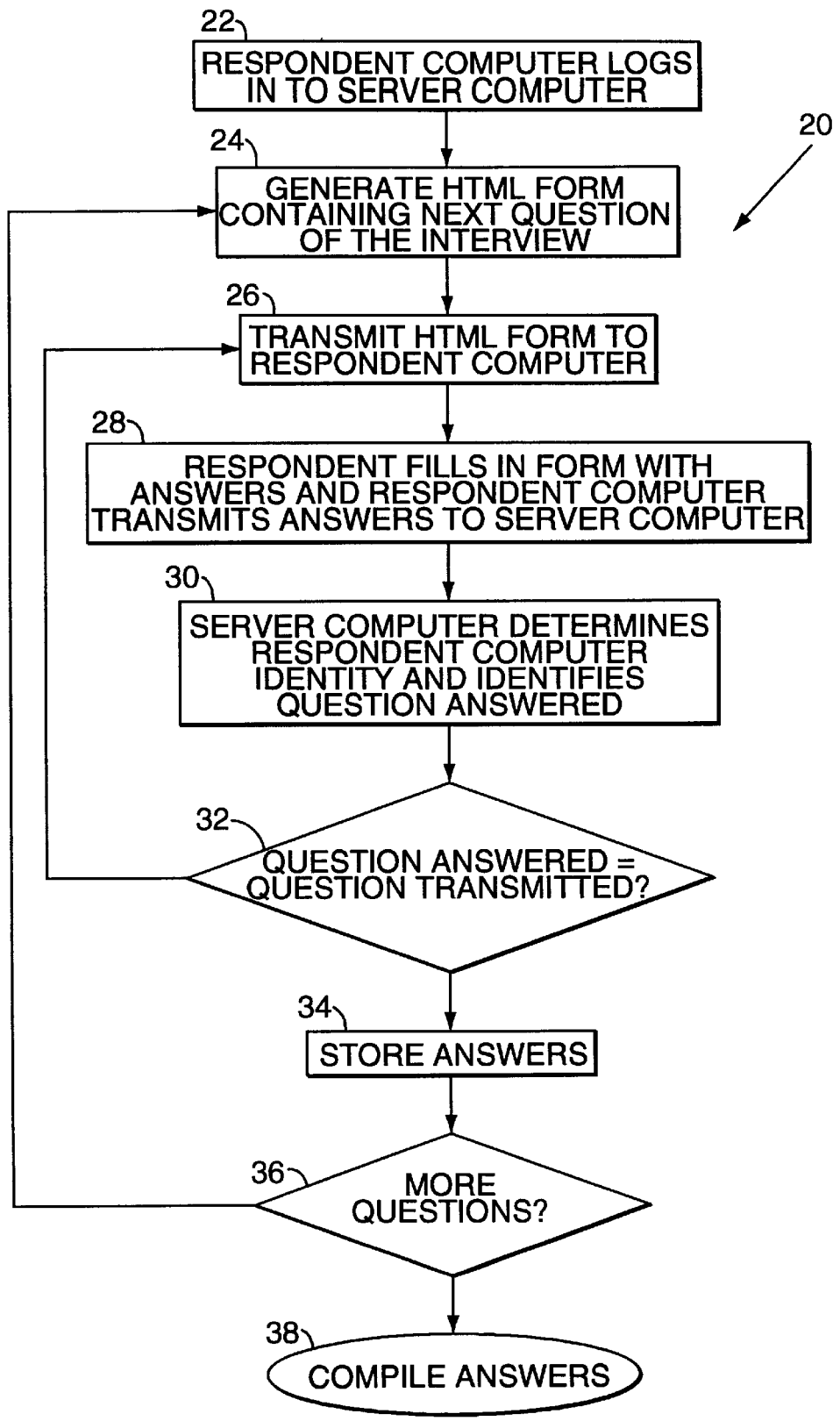
FIG. 2 is a flow chart illustrating conceptually the procedural steps for conducting an interview between a server computer and a respondent computer.

FIG. 2 illustrates a method 20 by which the server computer 12 and the respondent computer 14 of FIG. 1 interact during an interview conducted in accordance with the present invention. The interview process is initiated when the respondent computer 14 accesses the server computer (step 22) and requests the interview. This is preferably accomplished by establishing a Uniform Resource Locator (URL) as the "address" of the interview. Thus, browsers which access the URL of the interview automatically initiate a "process" on the server without explicitly "requesting" the interview.

When the respondent computer accesses the URL of the interview, the server computer executes server software, preferably implemented as Common Gateway Interface (CGI) software, for interacting with the respondent computer and conducting the interview. As is known in the art, CGI protocol is the process interface between the HTTP server and software executing on the HTTP client computer. As is also known in the art, HTTP request formats for communicating (exchanging data) between an HTTP server and an HTTP client include the GET and POST methods, which are typically the only methods used for exchanging data.

The server computer, under the direction of the server software, generates signals indicative of a Hypertext Markup Language (HTML) form containing a question of the interview (step 24). A question is defined as text, graphics, other prompting output, or a combination thereof, for eliciting a response. Signals indicative of a question can be, for example, signals indicative of ASCII characters; signals indicative of graphics, such as Graphics Interchange Format (GIF) graphics; signals indicative of sound, such as "WAV" or "SND" type sound signals; signals indicative of graphical user interface "buttons" or "menus"; and/or signals indicative of embedded objects such as Java applets or Activex components. HTML is described in "Special Edition: Using HTML", by Tom Savola, 1995, Que® Corporation, and RFC 1866, "Hypertext Markup Language—2.0", by T. Berners-Lee and D. Connolly, November 1995, both of which are incorporated herein by reference as part of the present disclosure.

The signals indicative of a question are for eliciting at least one response from a respondent, such as entry of text, mouse movement, mouse button press or other input action. The signals indicative of a question may be for eliciting a plurality of different responses, and accordingly may comprise, for example, a plurality of sentences of text or a plurality of graphical "buttons", or a combination thereof.

The form containing the question is transmitted to the respondent computer (step 26). The respondent, in turn, fills in the form with an answer in a known manner using the web browser of the respondent computer, and the respondent computer transmits the answer to the server computer (step 28).

The server computer determines the identity of the respondent computer and identifies the question answered (step 30) in a manner described in detail below. The server computer determines if the question answered by the respondent is the same as the question transmitted to the server computer (step 32). If not, the server computer again transmits the form containing the question to the respondent computer. If the question answered by the respondent is the same as the question transmitted to the server computer, then the respondent's answer is stored (step 34). If there are more questions in the interview (step 36), then the server computer generates signals indicative of a Hypertext Markup Language (HTML) form containing another question of the interview, and continues the interview process. If there are no more questions, then the stored answers are compiled (step 38).

Turning to FIG. 3, the server computer determines the identity of the respondent computer and identifies the question answered by the respondent in accordance with the process 40. When the respondent computer accesses the server computer and requests the interview, the server computer generates a unique identifier of the respondent computer (step 42). A preferred method of generating a unique identifier of the respondent computer is to concatenate signals indicative of the time, for example as generated by the Unix system routine "time(3)", with signals indicative of the process number of the current process requesting the interview, for example the Unix system routine "getpid(3)". As is known in the art, no two processes on the server computer may have the same process number at the same time. Thus, the concatenation of the time and process number provides a unique identifier of the respondent computer.

When generating an HTML form containing a question of the interview (step 44), the server computer generates a unique identifier of the HTML form (step 46). This can be a unique number from 1 to N for each of N forms. The unique identifier of the respondent computer is concatenated to the unique identifier of the HTML form, and embedded in the HTML form as a HIDDEN form field (step 48). As is known in the art, information in a HIDDEN form field is not displayed by a web browser, and thus the embedded identifiers are not visible to the respondent. However, information in HIDDEN form fields is transmitted along with answers embedded in the other, visible form fields.

The server computer waits for the respondent computer to transmit an answer (step 50), and upon receiving the answer the server computer also receives the concatenated unique identifier of the respondent computer and the unique identifier of the HTML form. The server computer retrieves and separates the unique identifier of the respondent computer and the unique identifier of the HTML form (step 52). Thus, the server computer determines which respondent computer sent the received answers and which question is associated with the received answers.

Turning now to FIG. 4, it is preferred that the above-described system for conducting an interview between a server computer and a respondent computer be easily adaptable to various types of interviews and various questions. Accordingly, a system 60 is provided for translating a text file 62, created by an entity desiring a survey or other interview, into the server software 63 described above. A translator 64, such as a lexical parser, receives signals indicative of the text file 62 and generates in dependence thereon signals indicative of three files: (i) C or C++ computer program which, when compiled and linked, executes the server software; (ii) a text file containing HTML code which defines HTML forms; and (iii) a file listing names of variables for storing the answers from the respondent.

Although the invention has been shown and described with respect to a preferred embodiment thereof, it would be understood by those skilled in the art that other various changes, omissions and additions thereto may be made without departing from the spirit and scope of the invention as defined in the appended claims. For example, there are other connectionless mediums besides those which employ an HTTP protocol. Accordingly, this detailed description of a preferred embodiment is to be taken in an illustrative, as opposed to a limiting sense.

What is claimed is:

1. A method for conducting an interview between a server computer and a respondent computer with a connectionless protocol, the interview including a plurality of questions and each question having a unique question identifier, comprising:

generating signals indicative of a first question;

generating signals indicative of a first question identifier, which is the question identifier of the first question;

transmitting the signals indicative of the first question and the signals indicative of the first question identifier from the server computer to the respondent computer;

generating signals indicative of the identity of the respondent computer;

generating signals indicative of a first answer to a second question;

generating signals indicative of a second question identifier, which is the question identifier of the second question;

transmitting the signals indicative of the identity of the respondent computer, the signals indicative of the first answer and the signals indicative of the second question identifier from the respondent computer to the server computer, thereby answering the second question;

storing the signals indicative of the first answer in a location prescribed by the signals indicative of the identity of the respondent computer, thereby associating the first answer as being transmitted by the respondent computer in response to the second question.

2. The method of claim 1, further comprising:

comparing the signals indicative of the first question identifier with the signals indicative of the second question identifier; and wherein the step of storing is performed if the step of comparing indicates that first question identifier is equal to the second question identifier, and accordingly the first question transmitted from the server is equal to the second question answered by the respondent computer.

3. The method of claim 2, further comprising:

transmitting the signals indicative of the first question and the signals indicative of the first question identifier from the server computer to the respondent computer, if the step of comparing indicates that the first question identifier is not equal to the second question identifier, and accordingly the first question transmitted from the server is not equal to the second question answered by the respondent computer.

4. An apparatus for conducting an interview between a server computer and a respondent computer with a connectionless protocol, the interview including a plurality of questions and each question having a unique question identifier, comprising:

means for generating signals indicative of a first question and signals indicative of a first question identifier, which is the question identifier of the first question;

means for transmitting the signals indicative of the first question and the signals indicative of the first question identifier from the server computer to the respondent computer;

means for generating signals indicative of the identity of the respondent computer, signals indicative of a first answer to a second question and signals indicative of a second question identifier, which is the question identifier of the second question;

means for transmitting the signals indicative of the identity of the respondent computer, the signals indicative of the first answer and the signals indicative of the second question identifier from the respondent computer to the server computer, thereby answering the second question;

means for storing the signals indicative of the first answer in a location prescribed by the signals indicative of the identity of the respondent computer, thereby associating the first answer as being transmitted by the respondent computer in response to the second question.

* * * * *